United States Patent [19]

Meno

[11] 4,449,084
[45] May 15, 1984

[54] POSITIONING SERVO-MECHANISM OR TACHOMETER EMPLOYING SELF-SCANNING LIGHT SENSING ARRAY

[75] Inventor: Frank Meno, Pittsburgh, Pa.

[73] Assignee: University of Pittsburgh, Pittsburgh, Pa.

[21] Appl. No.: 334,965

[22] Filed: Dec. 28, 1981

[51] Int. Cl.³ .............................................. G05B 1/06
[52] U.S. Cl. .................................. 318/640; 318/480; 250/237 R
[58] Field of Search ................... 250/237 R; 318/480, 318/640

[56] References Cited

U.S. PATENT DOCUMENTS

| | | | |
|---|---|---|---|
| 3,708,657 | 1/1973 | Kelling | 235/156 |
| 3,719,776 | 8/1970 | Fujiyasu et al. | 178/6.7 R |
| 3,864,564 | 2/1975 | Adkins | 250/201 |
| 3,886,562 | 5/1975 | Atzinger et al. | 318/640 X |
| 3,932,733 | 1/1976 | Olsen et al. | 235/151 |
| 3,934,187 | 1/1976 | Trotel | 318/640 |
| 4,021,711 | 5/1977 | Erickson et al. | 318/480 |
| 4,042,863 | 8/1977 | von der Heide . | |
| 4,087,729 | 5/1978 | Yamazaki et al. | 318/601 |
| 4,117,460 | 9/1978 | Walworth et al. | 340/190 |
| 4,146,924 | 3/1979 | Birk et al. | 364/513 |
| 4,156,169 | 5/1979 | Imamura | 318/616 |
| 4,187,456 | 2/1980 | von der Heide | 318/616 |
| 4,223,257 | 9/1980 | Miller | 318/594 |
| 4,243,925 | 1/1981 | Gnuechtel | 318/640 |
| 4,359,675 | 11/1982 | Miller | 318/640 |

Primary Examiner—B. Dobeck
Attorney, Agent, or Firm—Buell, Blenko, Ziesenheim & Beck

[57] ABSTRACT

Apparatus for precise positioning of a movable stage such as a microscope stage including a light source and a self-scanning array of photodiodes for receiving light from the light source. An opaque shade is adapted to be moved with the shade and block at least a portion of the light which otherwise would impinge on the self-scanning photodiode array. The self-scanning photodiode array is adapted to emit an electrical signal proportional to the number of photodiodes on which light impinges. A digital comparator is adapted receive this signal in digitized form and compare the same with a positioning program digital input. In the event of a difference a responsive signal is emitted to a bi-directional motor drive which effects corrective movement of the stage. The apparatus may also function as a tachometer.

10 Claims, 4 Drawing Figures

POSITIONING SERVO-MECHANISM OR TACHOMETER EMPLOYING SELF-SCANNING LIGHT SENSING ARRAY

BACKGROUND OF THE INVENTION

1. Field of the Invention

This invention relates to apparatus that employs self-scanning light sensing arrays for precisely positioning a movable stage or determining the speed of motion. More specifically, it relates to the use of self-scanning arrays of photodiodes in determining the actual position of a movable stage or speed of a moving member.

2. Description of the Prior Art

It has been known in connection with the positioning of movable stages of microscopes and other instruments to employ mechanical means such as set screw means, micrometers and the like.

In other environments, it is also been known to employ various types of servo control systems for position sensing. See, generally U.S. Pat. Nos. 3,708,657; 3,934,187; 4,042,863; 4,087,729; 4,117,460; 4,146,924; 4,156,169; 4,187,456 and 4,223,257.

U.S. Pat. No. 4,042,863 discloses a light transmitter-receiver transducer having a diaphragm for incrementally controlling a motor drive system. The diaphragm has a programed pattern in order to control the amount of light that is permitted to pass therethrough.

U.S. Pat. No. 3,719,776 discloses means for photographing an image of a specimen which is projected onto a cathode ray tube through the scanning of the specimen and passage of an electron beam therethrough.

U.S. Pat. No. 3,932,733 discloses a system for focusing an optical system such as a microscope through the use of electronic means.

U.S. Pat. No. 3,864,564 discloses blocking of a light beam by means of a blood specimen disposed on a slide and cooperating with a logic circuit to produce a control signal.

In spite of the foregoing teachings, there remains a very real and substantial need for an effective, rapid and accurate means of positioning a movable stage with great accuracy such as is needed in medical uses for chromosome analysis, blood cells and tissue cells studies wherein microscope stage positioning must be accomplished reproducibly and automatically within a few microns.

SUMMARY OF THE PRESENT INVENTION

The above described need has been met by the present invention. The invention employs a light source means which cooperates with a self-scanning array of photodiodes and a reciprocating opaque shade which is adapted to interrupt a portion of the light beam travelling to the self-scanning array of photodiodes. Electronic means, preferably digital in nature, serve to compare the electrical signal emitted by the self-scanning array of photodiodes, as converted to digital form with a predetermined programmed digital signal. In the event of the difference between such signals, a signal is emitted by a bi-directional motor drive to effect corrective movement of the stage in either direction. Continued monitoring of the servo system results in confirmation of proper placement of the movable stage or further automated corrective action.

It is an object of the present invention to provide a rapid, economical and effective servomechanism means for precise positioning of a movable stage.

It is another object of the present invention to eliminate the need for reliance on cumbersome, costly and slow mechanical means for positioning of a movable stage.

It is a further object of the present invention to provide the rapid and efficient use of a selfscanning array of photodiodes and effecting precise positioning of a movable stage to within a few microns ($10^{-6}$ m).

It is another object of the present invention to provide a system generally of the above described type which is adapted to function as a tachometer.

It is a further object of the present invention to provide for a digital system for making effective use of the output of the self-scanning array of photodiodes for the above purposes.

It is yet another object of the present invention to provide such apparatus wherein simple programming will permit desired control over the servomechanism positioning apparatus.

These and other objects of the invention will be more fully understood from the following description of the invention in reference to the illustrations appended hereto.

DESCRIPTION OF THE PREFERRED EMBODIMENT

Figure 3:
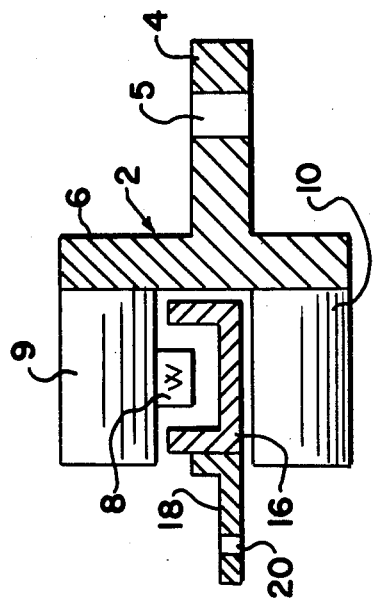
FIG. 3 is a cross-sectional illustration of the senser of FIG. 2 taken through 3—3.
Figure 2:
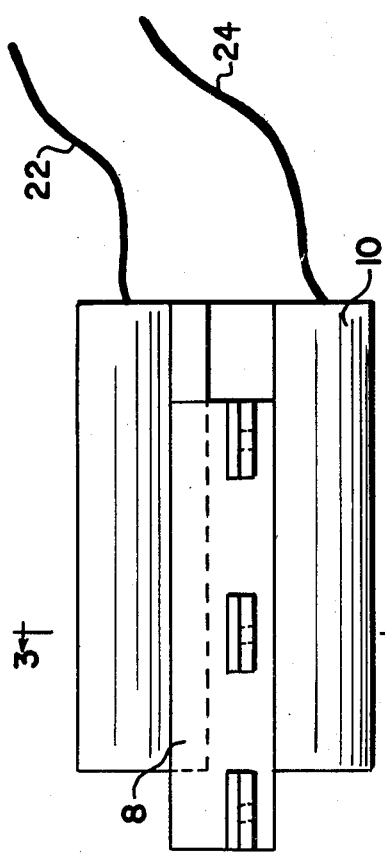
FIG. 2 is a front elevational view of the assembly of FIG. 1 (without the movable stage).
Figure 1:
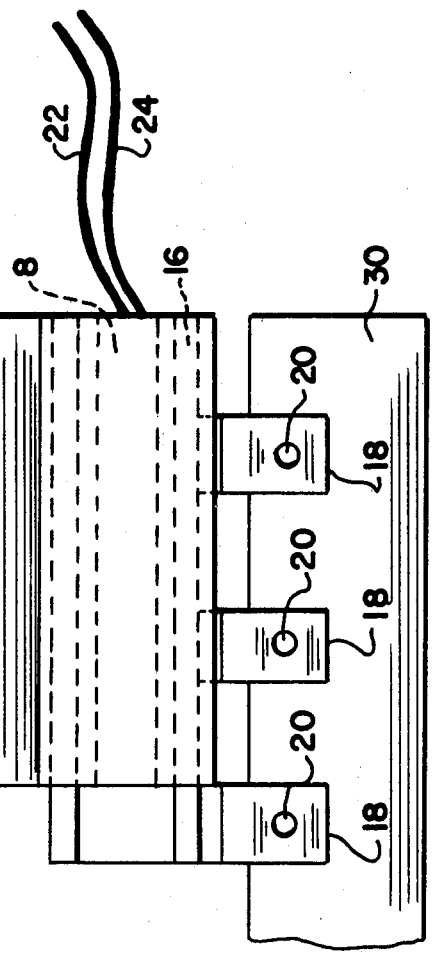
FIG. 1 is a partially schematic illustration of a top plan view of the sensor assembly of the present invention.

Referring now to FIGS. 1 through 3 in greater detail there is shown a holder 2 which has a flange 4 projecting outwardly therefrom. Flange 4 is provided with a series of openings 5 in order to permit securement of the source of light and photodiode array to a suitable support member (not shown). A body portion 6 supports the self-scanning array of photodiodes 8, which, in the form shown, is a linear array which projects generally downwardly from support member 9. In spaced underlying relationship with respect to the self-scanning photodiode array 8 is a light source 10 of uniform intensity such as a suitable solid state or incandescent light source.

The self-scanning array of photodiodes has the advantage of not only converting impinging light into a responsive, electrical signal which represents a function of the intensity of the light received, but also precisely delineates the number of diodes illuminated. Thus, for example, the linear array may consist of approximately 4,100 sensors or photodiodes spaced $10^{-5}$ meter from each other and provide a total range of about 4 centimeters at 10 micron resolution.

Cable 22 serves to deliver various control signals and power to the array of photodiodes 8 and also transmits the electrical signal emerging from the self-scanning array of photodiodes 8. Cable 24 serves to energize the light source 10.

Also shown in FIGS. 1 through 3 are an opaque shade member 16 which is secured by support tabs 18 to the movable stage 30. Each tab 18 is provided with an opening 20 through which suitable fasteners (not shown) may be passed to secure the assembly. The shade 16 is adapted for relative longitudinal reciprocating movement with respect to the self-scanning array of photodiodes 8 movement of shade 16 in a first direction will sequentially increase the number of the photodiodes receiving the light and movement of shade 16 in a second direction will sequentially reduce the number of the photodiodes exposed to the light.

It will be appreciated, therefore, that the position of the movable stage will correspond with a particular position of the shade 16 thereby permitting the shade to block a certain amount of light emitted from the light source means 10 which would otherwise impinge upon the self-scanning array of photodiodes 8. The electrical signal emerging from the self-scanning array of photodiodes will, therefore, provide a direct indication to the precise position of the movable stage.

In the form shown it will be noted that the opaque shade member 16 has a generally upwardly open channel shaped configuration which at least partially receives the photodiode array 8, thereby minimizing the likelihood of inaccurate readings being produced by stray light impinging upon the photodiode array.

Figure 4:
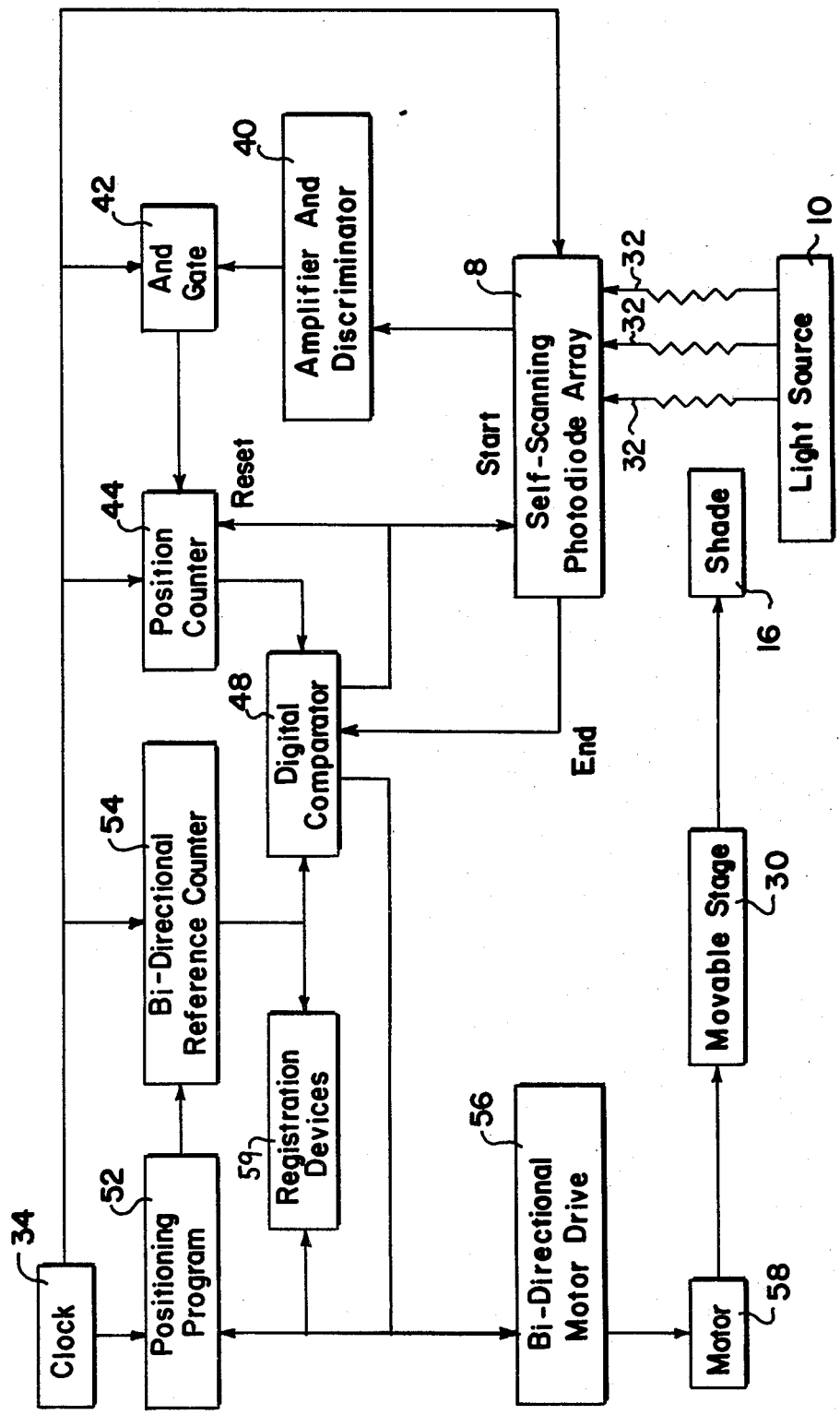
FIG. 4 is a block diagram illustrating the interaction of the components of the system.

Referring now to FIG. 4, a schematic diagram showing the interaction of the components will now be considered. As the individual electronic components may be of any acceptable form which would readily be known to those skilled in the art, detailed descriptions of these specific components as distinguished from the assembly need not be provided.

The light source 10 emits a substantially continuous light beam 32 which in the region not obstructed by shade 16 will be received by the self-scanning array of photodiodes. Under the influence of clock 34, the shift register of the self-scanning array of photodiodes 8 will be clocked and synchronously scan the array. The electrical output signal from each diode in the array will be proportional to the intensity of the illumination received. The number of photodiodes illuminated will be a function of the position of the shade 16. The electrical signal is then passed to the amplifier and discriminator 40 wherein the signal is amplified and under the influence of the discriminator, which has a pre-established cutoff, any light received by the shaded photodiodes will not be permitted to be registered therebeyond. As a result, the output signal passing through the amplifier discriminator 40 will be limited to the electrical signals corresponding to the intensity of illumination received on those photodiodes not shielded by shade 16. The AND gate circuit 42 receives the signal and locks the same in synchrony with the clock 34 and produces a standard logic-level pulse signal which is introduced into position counter 44 which totals the count for each scan of the sensor array. As a result, this count in the position counter 44 corresponds directly to the number of illuminated photodiodes in the array 8 and is therefore proportional to the position of the shade or shutter 16. The digital comparator 48 then receives the output of position counter 44. After each scan of array 8 is completed, a signal is sent from the array to the comparator 48 to initiate the comparison. After the comparison is made, a signal is sent to reset the position counter 44 and initiate another scan on the array 8.

The positioning program 52 may take the form of a simple digital programmer which has pre-established the desired programing information in respect of position of the movable stage 30. This information is delivered to the bi-directional reference counter 54 which in turn delivers the same as a reference count to digital comparator 48. If the count received from position counter 44 and bi-directional reference 54 are identical, the digital comparator emits no output. If the position count as received by the comparator 48 from the position counter 44 is less than or greater than the reference count received from reference count 54 either a forward or reverse drive signal emerges from comparator 48 and actuates the bi-directional motor drive 56 in order to effect responsive movement of the motor 58 in the desired direction of rotation so as to move the stage 30 and shade 16 in the desired direction. The motor motion may advantageously be delivered directly to the stage positioning screw (not shown) and such motion will continue until the shade 16 permits exposure of the predetermined desired number of photodiodes in array 8 in order to permit the counts emerging from counter 44 to be identical to that on counter 54. At this point the comparator 48 terminates motor motion. In the event that the shade 16 might for any reason over travel or be accidentally displaced, the position count would reflect the departure from the reference counter standard and a reverse drive signal would be provided to move the shade 16 to the desired position.

Registration devices 59 may be provided to read and store the positioning information. Examples of such units would be count displays, printers or count-storage memory devices such as magnetic tapes, punched paper tape, magnetic discs and the like.

While the present invention is uniquely and advantageously designed for use in precise positioning of a microscope stage, it will be appreciated that it may readily be employed in connection with other types of instruments and devices.

It will be appreciated that while a single device for detecting movement in a single axis, such as the X axis has been disclosed, additional such devices may be provided for monitoring movement in the Y and Z if desired.

The apparatus of the present invention is adapted with slight modification to function as a tachometer. In this fashion, a precise determination of the speed of movement may be achieved. In such a system, a timing control (not shown) consisting of a clock, dividers and gates would be operatively associated with the self-scanning array 8. An up-down counter (not shown) is operatively associated with both the array 8 and the timing control. A readout means (not shown) for providing a record and/or readout of speed of movement of the shade is operatively associated with the up-down counter and timing control. The timing control directs the position count from the array to accumulate first as the "up count" and then as the "down count". This counting up and counting down in alternate cycles results in the difference count between successive time intervals determined by the timing control. This difference count is proportional to the speed with which the shade, and consequently the stage, travels. Therefore, the readout device that indicates the difference count can be calibrated in units of speed.

While for convenience of disclosure herein specific reference has been made to linear arrays, it will be appreciated that multiple linear arrays or arrays of other shapes may be employed.

It will be appreciated, therefore, that through the beneficial use of self-scanning array of photodiodes very rapid and extremely precise positioning of the stage is effected in an automatic and continuous fashion. Also, undesired deviations which might be caused by mechanical disturbances are eliminated. Further, the digital system serves to provide effective electronic follow-through on the optically sensed information.

Whereas particular embodiments of the invention have been described above for purposes of illustration it will be evident to those skilled in the art that numerous variations of the details may be made without departing from the invention as defined in the appended claims.

I claim:

1. Apparatus for precise positioning of a movable stage at one of a number of predetermined positions comprising
   light source means,
   a self-scanning array of photodiodes including a plurality of said photodiodes positioned to receive light from said light source means and adapted to emit a responsive electrical signal proportional to the number of photodiodes receiving said light,
   opaque shade means for movement responsive to movement of said stage,
   said shade means being mounted for reciprocating movement between said light source means and said self-scanning array of photodiodes,
   motor means for effecting movement of said shade means,
   electronic means for receiving said electrical signals from said self-scanning array of photodiodes and comparing such signals with a said predetermined position,
   said self-scanning array of photodiodes is a linear array,
   said shade means being adapted for relative longitudinal reciprocating movement with respect to said self-scanning linear array of photodiodes, whereby movement of said shade means in a first direction will sequentially increase the number of said photodiodes receiving said light and movement of said shade means in a second direction will sequentially reduce the number of said photodiodes receiving said light, and
   said electronic means having means for emitting a signal to said motor means to effect corrective movement of said stage if said comparison indicates that said stage is not in the desired predetermined position.

2. The positioning apparatus of claim 1 including said shade means being fixedly secured to said stage.

3. The positioning apparatus of claim 2 including said stage being a microscope stage.

4. The positioning apparatus of claim 1 including said electronic means having digital comparator means for effecting said comparison, and said electronic means having positioning program means for providing said predetermined standard signal to said comparator means.

5. The positioning apparatus of claim 4 including bi-directional motor drive means for initiating operation of said motor in a direction to effect movement of said stage in the desired direction.

6. The positioning apparatus of claim 5 including first counter means interposed between said positioning program means and said comparator means for providing a first digital signal corresponding to the desired stage position to said comparator means, and second counter means interposed between said comparator means and said self-scanning array of photodiodes for providing a second digital signal corresponding to the actual stage position.

7. The positioning apparatus of claim 6 including amplifier means for amplifying the output of said self-scanning array of photodiodes.

8. The positioning apparatus of claim 7 including clock means operatively associated with said self-scanning array of photodiodes and said program positioning means for coordinating operation thereof.

9. The positioning apparatus of claim 8 including AND gate means receiving input from said clock means and said self scanning array of photodiodes and said gate means adapted to emit responsive output to said second counter means.

10. The positioning apparatus of claim 1 including said shade means being generally channel shaped, and said self scanning array of photodiodes at least partially received within said channel.

* * * * *